(12) United States Patent
Rangarajan et al.

(10) Patent No.: US 9,043,504 B2
(45) Date of Patent: *May 26, 2015

(54) INTERFACES FOR DIGITAL MEDIA PROCESSING

(71) Applicant: Microsoft Corporation, Redmond, WA (US)

(72) Inventors: Rajasekaran Rangarajan, Kirkland, WA (US); Martin Regen, Bavaria (DE); Richard Gains Russell, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,529

(22) Filed: Dec. 16, 2013

(65) Prior Publication Data

US 2014/0281054 A1 Sep. 18, 2014

Related U.S. Application Data

(63) Continuation of application No. 11/824,720, filed on Jun. 30, 2007, now Pat. No. 8,612,643.

(51) Int. Cl.
*G06F 13/28* (2006.01)
*G06F 15/167* (2006.01)
(Continued)

(52) U.S. Cl.
CPC .............. *G06F 3/0656* (2013.01); *G06F 9/544* (2013.01); *G11B 20/10527* (2013.01);
(Continued)

(58) Field of Classification Search
CPC ..... G06F 9/544; G06F 3/0656; G06F 3/0611; H04N 5/85; H04N 21/42646; H04N 21/4325; H04N 21/4431; G11B 2020/10537; G11B 2020/10666; G11B 2020/10759; G11B 2020/10944; G11B 2220/2562; G11B 20/10527

See application file for complete search history.

(56) References Cited

U.S. PATENT DOCUMENTS 5,864,713 A 1/1999 Terry
6,105,119 A 8/2000 Kerr et al.
(Continued)

FOREIGN PATENT DOCUMENTS

CN 1455409 A 11/2003
CN 1138409 C 2/2004
(Continued)

OTHER PUBLICATIONS

Japanese Office Action dated Feb. 13, 2013, issued in connection with corresponding Japanese Patent Application No. 2010-515037 with English Language translation (7 pages).
(Continued)

*Primary Examiner* — Jing-Yih Shyu
(74) *Attorney, Agent, or Firm* — Micah Goldsmith; Judy Yee; Micky Minhas

(57) ABSTRACT

APIs discussed herein promote efficient and timely interoperability between hardware and software components within the media processing pipelines of media content players. A PhysMemDataStructure API facilitates a hardware component's direct access to information within a memory used by a software component, to enable the hardware component to use direct memory access techniques to obtain the contents of the memory, instead of using processor cycles to execute copy commands. The PhysMemDataStructure API exposes one or more fields of data structures associated with units of media content stored in a memory used by a software component, and the exposed fields store information about the physical properties of the memory locations of the units of media content. SyncHelper APIs are used for obtaining information from, and passing information to, hardware components, which information is used to adjust the hardware components' timing for preparing media samples of synchronously-presentable media content streams.

20 Claims, 8 Drawing Sheets

(51) Int. Cl.
*G06F 3/06* (2006.01)
*G06F 9/54* (2006.01)
*G11B 20/10* (2006.01)
*H04N 5/85* (2006.01)
*H04N 21/426* (2011.01)
*H04N 21/432* (2011.01)
*H04N 21/443* (2011.01)

(52) U.S. Cl.
CPC ............... *G11B 2020/10537* (2013.01); *G11B 2020/10666* (2013.01); *G11B 2020/10759* (2013.01); *G11B 2020/10944* (2013.01); *G11B 2220/2562* (2013.01); *H04N 5/85* (2013.01); *H04N 21/42646* (2013.01); *H04N 21/4325* (2013.01); *H04N 21/4431* (2013.01); *G06F 3/0611* (2013.01)

(56) References Cited

U.S. PATENT DOCUMENTS

| | | |
|---|---|---|
| 6,262,777 B1 | 7/2001 | Brewer et al. |
| 6,373,527 B1 | 4/2002 | Lee |
| 6,434,171 B1 | 8/2002 | Ishida |
| 6,621,588 B1 | 9/2003 | Shimada |
| 6,654,428 B1 | 11/2003 | Bose et al. |
| 6,715,126 B1 | 3/2004 | Chang et al. |
| 6,816,909 B1 | 11/2004 | Chang et al. |
| 6,892,242 B1 | 5/2005 | Tamayama et al. |
| 6,983,467 B2 | 1/2006 | Engstrom et al. |
| 7,013,468 B2 | 3/2006 | Abercrombie et al. |
| 7,694,008 B2 | 4/2010 | Chang et al. |
| 7,897,865 B2 * | 3/2011 | Uehara ........................... 84/645 |
| 8,378,199 B2 * | 2/2013 | Uehara ........................... 84/645 |
| 2004/0156449 A1 | 8/2004 | Bose et al. |
| 2005/0209719 A1 | 9/2005 | Beckert et al. |
| 2005/0257239 A1 | 11/2005 | Evans et al. |

FOREIGN PATENT DOCUMENTS

| | | |
|---|---|---|
| JP | 2005-18842 | 1/2005 |
| JP | 2005-32379 | 2/2005 |
| JP | 2005-235171 | 9/2005 |
| JP | 2006-50648 | 2/2006 |
| TW | 200630992 A | 9/2006 |
| WO | 2006/039174 | 4/2006 |
| WO | 2006/059449 | 6/2006 |
| WO | 2006/061316 | 6/2006 |

OTHER PUBLICATIONS

European Search Report mailed Apr. 11, 2011, issued in connection with corresponding European Patent Application No. 08780956 (12 pages).

D. Melpignano, P. Sen, "Using OpenMAX Integration Layer with GStreamer", Retrieved at <<http://www.khronos.org/files/openmax/whitepapers/openmax_IL_with_GSstreamer.pdf >>, Version 1.0, Apr. 24, 2006 (22 pages).

Howard, Philip, "VRB-Virtual Ring Buffer", Retrieved at <<http://vrb.slashusr.org/ >>, Aug. 2, 2006 (2 pages).

"Office Action and Search Report Received in Taiwan Patent Application No. 97123953", Mailed Date: Nov. 27, 2013, Filed Date: Jun. 26, 2008, 18 Pages.

"Notice of Allowance Received in Taiwan Patent Application No. 97123953", Mailed Date: Mar. 10, 2014, Filed Date: Jun. 26, 2008, 4 Pages.

"First Office Action and Search Report Received in Chinese Patent Application No. 201110306936.3", Mailed Date: Feb. 26, 2014, Filed Date: Jun. 24, 2008, 12 Pages.

* cited by examiner

INTERFACES FOR DIGITAL MEDIA PROCESSING

CROSS-REFERENCE TO RELATED APPLICATIONS

This application is a continuation of U.S. Ser. No. 11/824,720, filed Jun. 30, 2007, entitled, "INTERFACES FOR DIGITAL MEDIA PROCESSING", now U.S. Pat. No. 8,612,643, issued Dec. 17, 2013, which is incorporated herein by reference in its entirety.

BACKGROUND

Digital media presentations are composed of sequenced sets of media content such as video, audio, images, text, and/or graphics. When media content players render and/or present such sequenced sets of media content to users, they are referred to as streams of media content. Some media content players are configured to concurrently render and present more than one independently-controlled stream of media content (for example, a main movie along with features such as a director's commentary, actor biographies, or advertising). Such media content players may also be capable of rendering and presenting user-selectable visible or audible objects (for example, various menus, games, special effects, or other options) concurrently with one or more streams of media content.

Any type of device in the form of software, hardware, firmware, or any combination thereof may be a media content player. Devices such as optical media players (for example, DVD players), computers, and other electronic devices that provide access to large amounts of relatively inexpensive, portable or otherwise accessible data storage are particularly well positioned to meet consumer demand for digital media presentations having significant play durations.

It is common for various entities to supply different software and hardware components of media content players, and such components are expected to successfully interoperate in environments having limited processing and memory resources. It is therefore desirable to provide techniques for ensuring resource-efficient, relatively glitch-free play of digital media presentations, including the accurate synchronization of concurrently presentable streams of media content, on all types of media content players and architectures thereof.

SUMMARY

Digital media processing techniques and interfaces (such as application programming interfaces ("APIs")) discussed herein promote efficient, consistent interoperability between hardware and software components within a media processing pipeline associated with a media content player.

Generally, a media processing pipeline is responsible for receiving sets of media content from media sources such as optical disks, hard drives, network locations, and other possible sources, and performing processing tasks to prepare the sets of media content for presentation to a user as one or more media content streams of a digital media presentation such as a movie, television program, audio program, or other presentation. Sets of media content are referred to as "clips," with one clip generally received from one media source. Discrete portions of clips read from a particular media source are referred to herein as media content units, which are generally demultiplexed, decompressed, decoded, and/or decrypted. After being demultiplexed, such media content units are referred to herein as media samples. It will be appreciated, however, that the naming convention(s) used herein is/are for illustrative purposes only, and that any desired naming conventions may be used.

A media processing pipeline includes components such as media source readers, demultiplexers, decoders, decrypters, and the like, which are implemented in hardware or software or a combination thereof. Frameworks such as the Microsoft® DirectShow™ multimedia framework may be used to implement a media processing pipeline. It will be appreciated, however, that any now known or later developed framework may be used to implement a media processing pipeline.

Information (such as information about the media content itself and/or presentation of the media content to a user) is exchanged at boundaries between software components and hardware components in a media processing pipeline. In one information exchange scenario, information within a memory (the term memory can encompass any type of computer-readable storage medium) used by a software component is usable by a hardware component. In another information exchange scenario, a hardware component modifies its operation based on information ascertained by a software component, or vice-versa.

One exemplary technique and interface discussed herein—referred to for discussion purposes as the "PhysMemDataStructure" interface—is configured for operation at a boundary between a software component and a hardware component of a media processing pipeline to facilitate the hardware component's direct access of information from a memory used by the software component, instead of using instructions/processor cycles to copy the information. The PhysMemDataStructure interface exposes to the hardware component one or more fields of data structures associated with units of media content (which are to be processed by the hardware component) stored in a memory used by the software component. The fields of the data structures store information about the physical properties of the memory where individual units of media content are located. Examples of such physical properties include but are not limited to type of memory, memory block size, locations of read/write pointers to memory locations, and offset locations of media content units with respect to such memory pointers. To further enhance the efficient use of memory resources, the software component may store units of media content in a ring buffer. To achieve still further memory and processing efficiencies, virtual memory may be used to duplicate the beginning portion of the ring buffer at the ending portion of the physical memory ring buffer.

Other exemplary techniques and interfaces discussed herein—referred to for discussion purposes as the "SyncHelper" interfaces—are configured to facilitate information exchange between hardware components and software components, which may be used to adjust timing (to maintain perceived synchronization between two media content streams, for example) or other operational aspects of the hardware or software components. One SyncHelper interface discussed herein—referred to as the "GetDecodeTimes" interface—provides information about a particular media content unit or media sample being rendered by a hardware component (such as a demultiplexer, decoder, or renderer) at a particular point in time. The provided information includes the elapsed amount of the play duration of the digital media presentation at the particular point in time, as well as the elapsed amount of the play duration of the clip from which the media sample was derived. Another SynchHelper interface—referred to as the "SyncToSTC" interface—facilitates synchronization of various concurrently presentable media content streams. In an exemplary scenario, the SyncToSTC interface ascertains (that is, either requests/receives or calculates) a difference between two values of the elapsed amount of the play duration of the digital media presentation returned by the GetDecodeTimes interface, and instructs one or more hardware components to adjust timing (for example, adjust the rate of a timing signal or adjust which media sample is being decoded or both) based on the ascertained difference.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

The predictable and relatively glitch-free play of a digital media presentation is often dependent on the efficient use of limited computing resources of the media content player, especially memory and processor resources. Glitches and inefficiencies can arise in various situations, especially when information is transferred between hardware components and software components operating in a media processing pipeline. In one scenario, inefficiencies may arise when information is transferred between a memory used by a software component and a memory used by a hardware component—it is desirable to minimize the processing and/or memory resources used in memory access transactions. In another scenario, glitches in the play of the media content stream(s) and/or user-perceived loss of synchronization may occur when multiple media content streams are prepared by separate hardware components for concurrent presentation to a user and appropriate information is not available to the hardware components to ensure operational synchronization—it is desirable to provide information to the hardware components for use in adjusting the timing for performing certain processing tasks.

Various techniques and application programming interfaces ("APIs") are discussed herein that operate at a boundary between a software component and a hardware component, to expose information usable by the hardware component to enhance the efficiency, accuracy and interoperability of the components operating in the media processing pipeline of a media content player.

Figure 1:
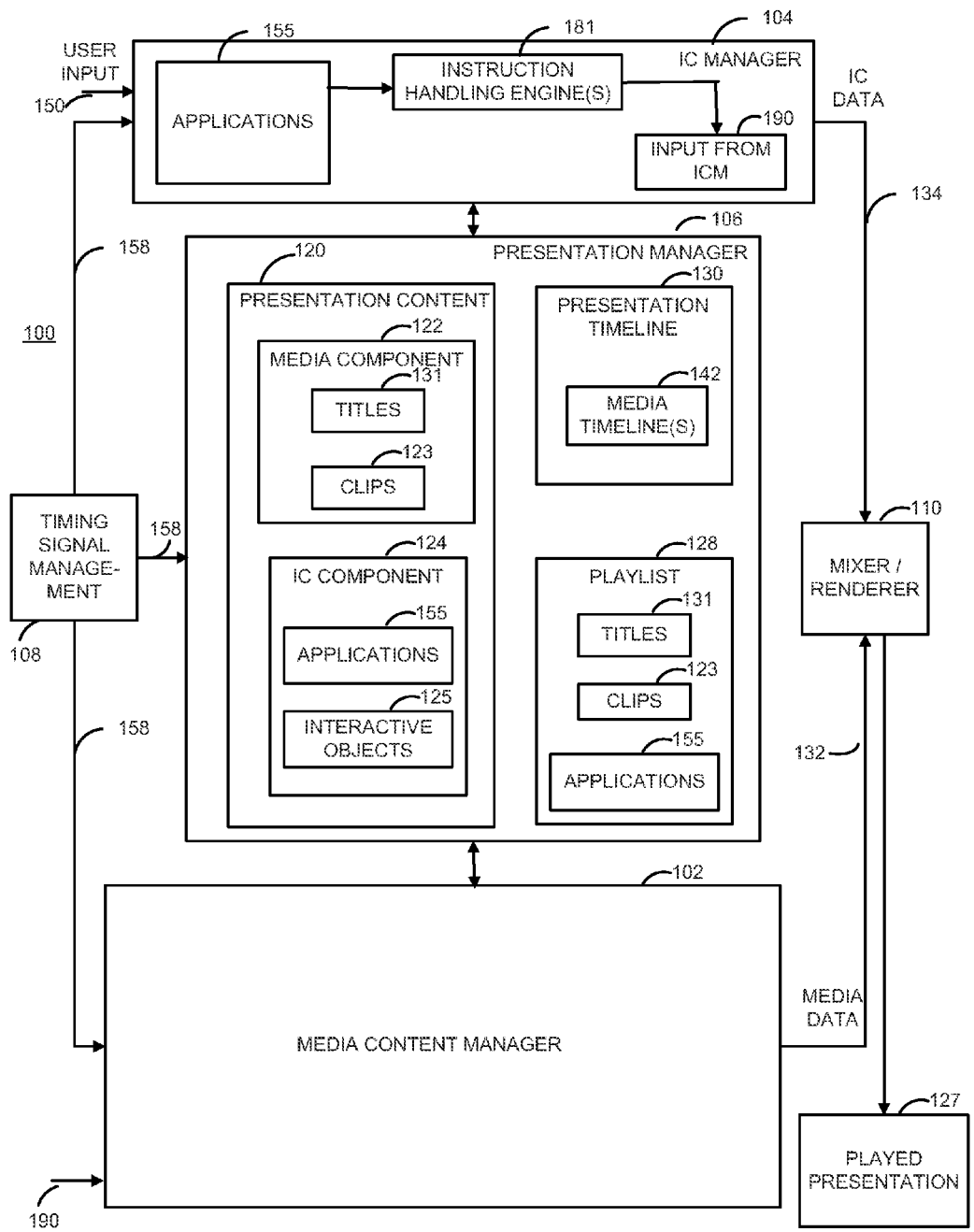
FIG. 1 is a simplified functional block diagram of an exemplary media content player.

Turning now to the drawings, where like numerals designate like components, FIG. 1 is a simplified functional block diagram of an exemplary media content player 100 (hereinafter referred to as "Presentation System" 100) that renders media content. Media content is composed of sequences (generally, time-ordered) of video, audio, images, text, and/or graphics. Presentation System may be any system that renders media content, including but not limited to an optical media player, a computing device or operating system thereof, an audio player, a set-top box, a telecommunication device, a personal digital assistant, an image or video capture device, and the like. For purposes of discussion, it is assumed that Presentation System is an interactive multimedia presentation system used to play media content such as movies or other types of presentations in concurrently with user-selectable visible or audible interactive objects (for example, menus, games, special effects, or other options).

As shown, Presentation System 100 includes a media content manager 102, an interactive content ("IC") manager 104, a presentation manager 106, a timing signal management block 108, and a mixer/renderer 110. In general, design choices dictate how specific functions of Presentation System 100 are implemented. Such functions may be implemented using hardware, software, or firmware, or combinations thereof.

In operation, Presentation System 100 handles interactive multimedia presentation content ("Presentation Content") 120. Presentation Content 120 includes a media content component ("media component") 122 and an interactive content component ("IC component") 124. Media component 122 and IC component 124 are generally, but need not be, handled separately streams, by media content manager 102 and IC manager 104, respectively.

Presentation System 100 facilitates presentation of Presentation Content 120 to a user (not shown) as played presentation 127. Played presentation 127 represents the visible and/or audible information associated with Presentation Content 120 that is produced by mixer/renderer 110 and receivable by the user via devices such as displays or speakers (not shown). For discussion purposes, it is assumed that Presentation Content 120 and played presentation 127 represent aspects of high-definition DVD movie content, in any format. It will be appreciated, however, that Presentation Content 120 and Played Presentation 127 may be configured for presenting any type of presentation of media content now known or later developed.

Media component 122 represents one or more sequences (generally, time-ordered) of video, audio, images, text, and/or graphics presentable to users as media content streams (media content streams 308 and 328 are shown and discussed further below, in connection with FIG. 2) within played presentation 127. More than one independently-controlled media content stream may be concurrently presented (for example, a main movie along with features such as a director's commentary, actor biographies, or advertising).

A movie generally has one or more versions (a version for mature audiences, and a version for younger audiences, for example); one or more titles 131 with one or more chapters (not shown) associated with each title (titles are discussed further below, in connection with presentation manager 106); one or more audio tracks (for example, the movie may be played in one or more languages, with or without subtitles); and extra features such as director's commentary, additional footage, actor biographies, advertising, trailers, and the like. It will be appreciated that distinctions between titles and chapters are purely logical distinctions. For example, a single perceived media segment could be part of a single title/chapter, or could be made up of multiple titles/chapters. It is up to the content authoring source to determine the applicable logical distinctions.

Sets of sequences of video, audio, images, text, and/or graphics that form aspects of media component 122 are commonly referred to as clips 123 (clips 123 are shown within media component 122 and playlist 128, and are also referred to in FIG. 2 and discussed further below). It will be appreciated, however, that sets of data sequences that form media component 122 may be grouped and/or referred to in any desirable manner and the actual data may be arranged into and represented by any desired units, for example, bits, frames, samples, data packets, groups of pictures, enhanced video object units, etc. The digital contents of a particular unit of data (and also the size of a unit of data) may be based on several factors, such as the characteristics of the video, audio, or data content comprising the unit, or one or more parameters associated with the media source from which the sample is derived (for example, media source identity and/or location, encoder/decoder parameters or settings, or encryption parameters or settings). Media sources are discussed further below, in connection with FIG. 2.

Media data 132 is data associated with media component 122 that has been prepared for rendering by media content manager 102 and transmitted to mixer/renderer 110. Media data 132 generally includes, for each active clip 123, a rendering of a portion of the clip.

Referring again to Presentation Content 120, IC component 124 includes interactive objects 125, which are user-selectable visible or audible objects, optionally presentable concurrently with media component 122, along with any instructions (shown as applications 155) for presenting the visible or audible objects. Examples of interactive objects include, among other things, video samples or clips, audio samples or clips, images, graphics, text, and combinations thereof.

Applications 155 provide the mechanism by which Presentation System 100 presents interactive objects 125 to a user. Applications 155 represent any signal processing method or stored instruction(s) that electronically control predetermined operations on data.

IC manager 104 includes one or more instruction handling engines 181, which receive, interpret, and arrange for execution of commands associated with applications 155. As execution of applications 155 progresses and user input 150 is received, behavior within played presentation 127 may be triggered. Execution of certain instructions of application 155, labeled as "input from ICM" 190, may facilitate communication or interoperability with other functionality or components within Presentation System 100. As shown, input 190 is received by media content manager 102 (discussed further below, in connection with FIG. 2), but other components or functions within Presentation System 100 may also be responsive to input 190.

Interactive content data ("IC data") 134 is data associated with IC component 124 that has been prepared for rendering by IC manager 104 and transmitted to mixer/renderer 110.

Timing signal management block 108 (discussed further below, in connection with FIG. 3) produces various timing signals 158, which are used to control the timing for preparation and production of media data 132 and IC data 134 by media content manager 102 and IC manager 104, respectively. For example, timing signal management block 108 is generally responsible for determining rates at which media data 132 ("media data presentation rate 207," shown and discussed in connection with FIG. 3) and IC data 134 are presented to a user. In another example, timing signals 158 are used to achieve approximate synchronization of media data 132 and/or IC data 134 (for example, timing/synchronization on a per-frame basis or on another time basis).

Mixer/renderer renders media data 132 in a video plane (not shown), and renders IC data 134 in a graphics plane (not shown). The graphics plane is generally, but not necessarily, overlayed onto the video plane to produce played presentation 127 for the user.

Presentation manager 106, which is configured for communication with media content manager 102, IC manager 104, mixer/renderer 110, and timing signal management block 108, facilitates handling of Presentation Content 120 and presentation of played presentation 127 to the user. Presentation manager 106 has access to a playlist 128. Playlist 128 includes, among other things, a time-ordered sequence of clips 123 and applications 155 (including interactive objects 125) that are presentable to a user. The clips 123 and applications 155/interactive objects 125 may be arranged to form one or more titles 131. As discussed above, it is possible for more than one independently-controlled title/media content stream to be concurrently played to a user. Such concurrently played streams may be indicated on playlist 128, or serendipitous user input may cause concurrent play of media content streams.

Presentation manager 106 uses playlist 128 to ascertain a presentation timeline 130 for a particular media presentation (a title 131 in the case of a movie), which generally has a predetermined play duration representing the particular amount of time in which the title is presentable to a user. Representations of amounts of specific elapsed times within the play duration are often referred to as "title times". Because a title may be played once or more than once (in a looping fashion, for example), the play duration is determined based on one iteration of the title. Conceptually, presentation timeline 130 indicates the title times when specific clips 123 and applications 155 are presentable to a user (although as indicated, it is not generally known when user inputs starting and stopping the play of some specific clips may occur). Specific clips 123 also generally have predetermined play durations representing the particular amounts of time for presenting the clip. Representations of amounts of specific elapsed times within the clip play durations are often referred to as "presentation times". Each individually-presentable portion of a clip (which may for discussion purposes be referred to as a "media sample," although any desired naming convention may be used) has an associated, pre-determined presentation time within the play duration of the clip. To avoid user-perceptible glitches in the presentation of media content, one or more upcoming media samples are prepared for presentation in advance of the scheduled/pre-determined presentation time.

To better illustrate the play of a particular clip and timing/times associated therewith, it is useful to use playlist 128 and/or presentation timeline 130 to ascertain one or more media content timelines ("media timeline(s)") 142. With continuing reference to FIGS. 1 and 2, FIG. 3 is an exemplary media timeline 142 for a particular clip 123. Various media sample presentation times 202 are indicated on media timeline 142. Media sample presentation times 202 represent times within the play duration of a particular clip at which one or more media samples are presentable as media data 132. As shown, media sample presentation times 202 occur at a rate based on a predetermined media data presentation rate 207, which may vary from clip-to-clip. Note that it is not necessary for media data presentation rate 207 to be the same as the rate at which a particular clip 123 was encoded, although the media data presentation rate may change based on the encoding rate for a particular clip. Certain user input 150 can also affect the speed of media sample retrieval from media sources and thus affect the rate at which media sample presentation times 202 occur. For example, played presentation 127 may proceed in a forward direction at a normal speed, and may also proceed in both forward and reverse directions at speeds faster or slower than the normal speed. It will appreciated that normal speed is a relative term, and that normal speed may vary from presentation to presentation, and from clip-to-clip. During fast-reverse and fast-forward operations, the playing of certain media content (as shown, media samples 230) is often skipped. Other user input may cause the playing of certain content to be skipped, such as when the user jumps from one part of the movie to another.

A current elapsed play time 209 (that is, the title time of the digital media presentation with which the clip is associated) is shown on media timeline 142. Media sample 250 is being presented to a user at current elapsed play time 209. As shown, current elapsed play time 209 coincides with a particular media sample presentation time 202, although such coinciding is not necessary. A next presentable media sample presentation time 214 is also shown. Next presentable media sample presentation time 214 is used to determine the next media sample, and/or the next media sample presentation time, that should be next prepared for presentation to a user (as shown, next processable media sample 270 is to be prepared for presentation). It will be appreciated that the next presentable media sample/presentation time may be the next consecutive media sample/presentation time based on playlist 128, or may be a media sample/presentation time one or more media samples/presentation times 202 away from the media sample/presentation time associated with current elapsed play time 209. There are various ways to ascertain the next presentable media sample/media sample presentation time, which are not discussed in detail herein. Generally, however, a predicted elapsed play time 220 (that is, predicted title time of the play duration of the digital media presentation) and the corresponding next presentable media sample/presentation time are ascertained. Information such as the play speed, media frame rate 207, and other information may be used to determine the predicted elapsed play time and/or locate the particular media sample presentation time/media sample.

Referring again to FIG. 1, in operation, presentation manager 106 provides information, including but not limited to information about presentation timeline 130 and/or media timeline 142 to media content manager 102 and IC manager 104. Based on input from presentation manager 106, IC manager 104 prepares IC data 134 for rendering, and media content manager 102 prepares media data 132 for rendering.

Figure 2:
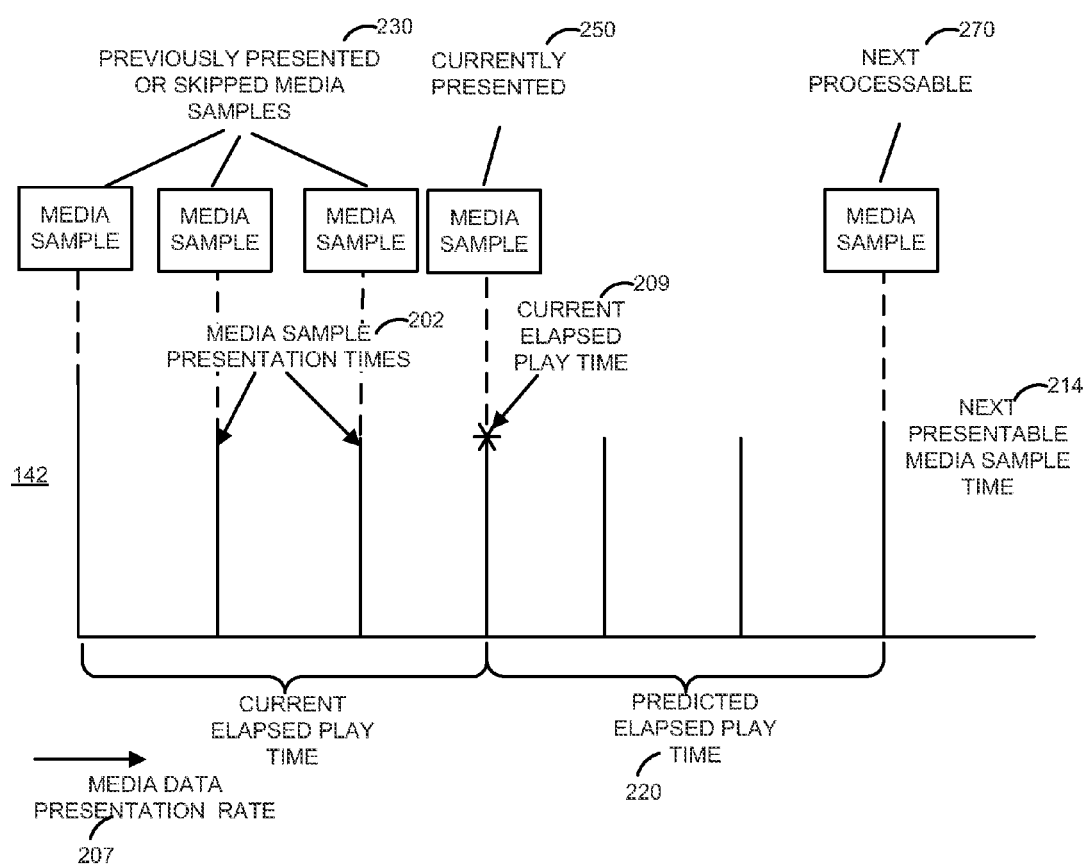
FIG. 2 is a schematic illustrating the exemplary media timeline(s) of FIG. 1 in more detail.
Figure 3:
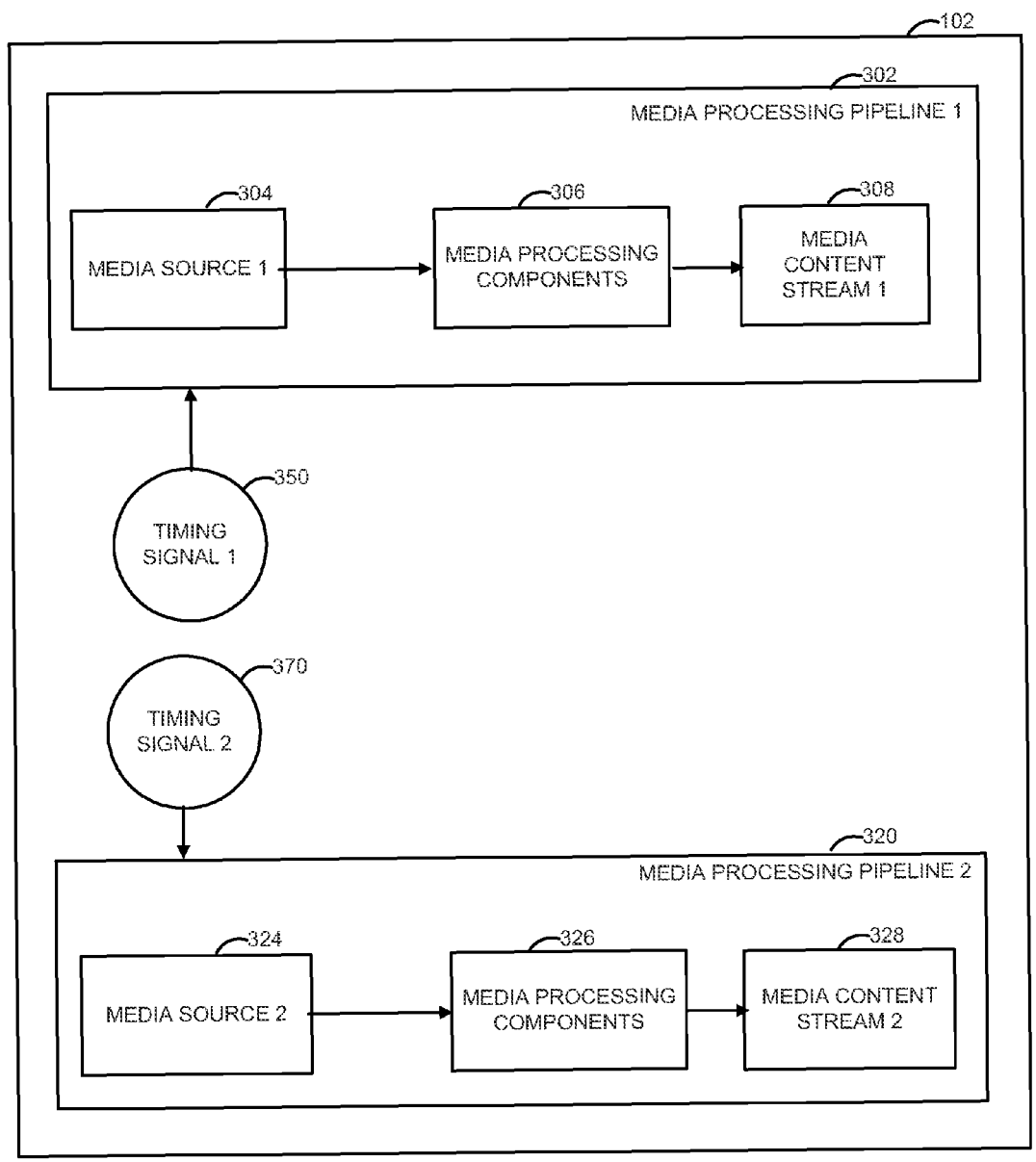
FIG. 3 is a simplified functional block diagram illustrating aspects of the media content manager block of FIG. 1 in more detail.

With continuing reference to FIGS. 1 and 2, FIG. 3 is a simplified functional block diagram illustrating aspects of media content manager 102 in more detail. Media content manager 102 includes one or more media processing pipelines. Two media processing pipelines are shown, media processing pipeline1 302 and media processing pipeline2 320, although any number of media processing pipelines is possible. Generally, media processing pipeline1 302 and media processing pipeline2 320 are used to prepare independently-controlled media content streams 308 and 328, respectively, for presentation to a user. One media processing pipeline is usually responsible for preparing a primary media content stream, such as a movie, with reference to a first timing signal 1 350, and other media processing pipelines are responsible for preparing one or more secondary media content streams, such as director's commentary, actor biographies, advertising, etc., with reference to a second timing signal 2 370. Timing signals represent the rate(s) at which samples of media content are retrieved from media sources and/or prepared for presentation to a user (such rate(s) may change dynamically, however, based on user input, encoding/encryption/compression formats, and other factors), and are generally derived from clocks sources (not shown), such as clock sources associated with Presentation System 100 and/or special-purpose devices such as hardware components within media processing pipelines.

Figure 4:
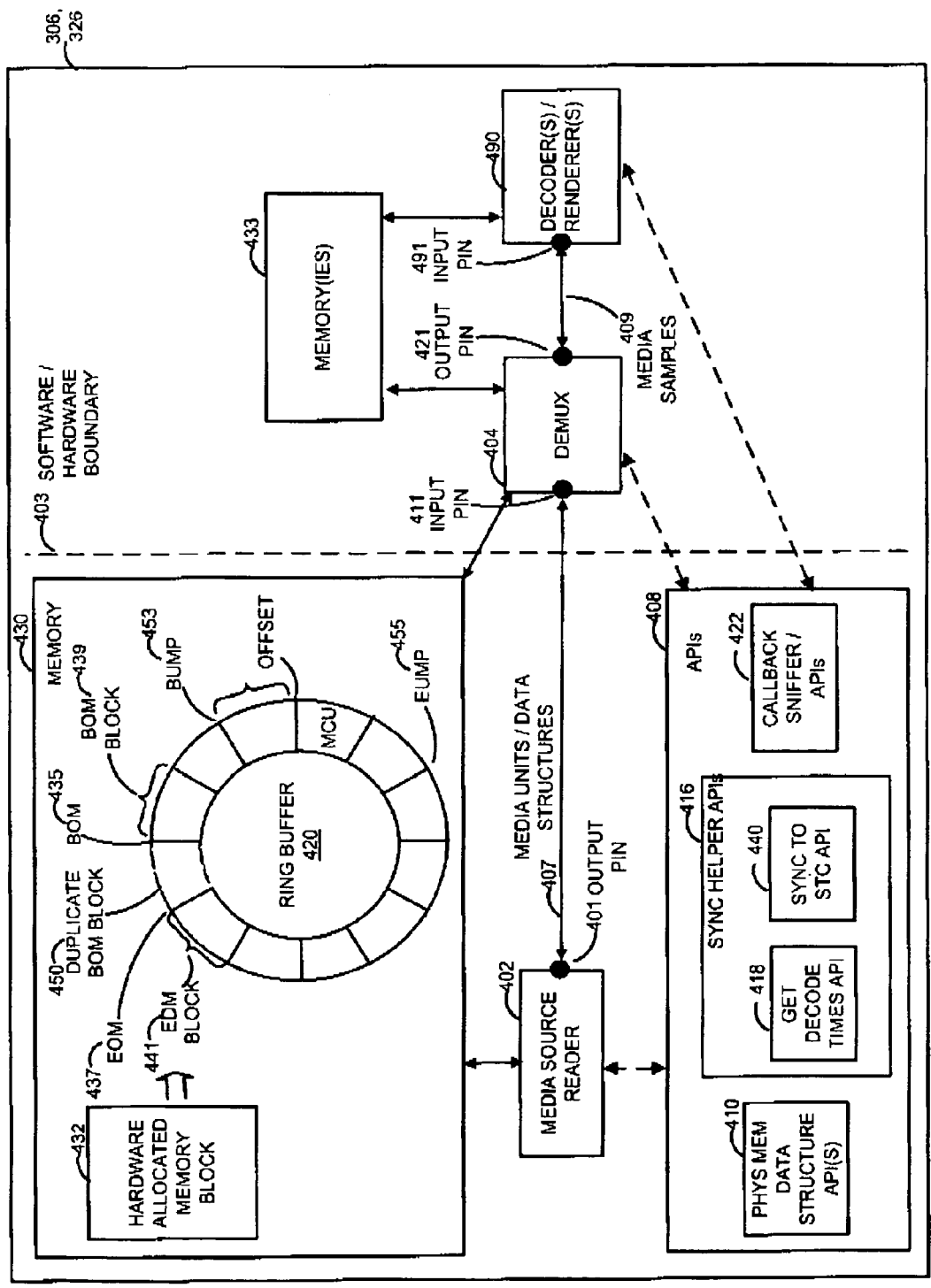
FIG. 4 is a simplified functional block diagram illustrating an exemplary architecture for aspects of the media processing pipeline illustrated in FIG. 3.

Media content manager 102 is responsible for preparing upcoming individually-presentable portions of clips, such as next processable media sample(s) 270 shown in FIG. 2, for presentation. Such preparation often involves multiple steps, including but not limited to reading the upcoming portion of the clip from a particular media source (media sources 304 and 324 shown, which are any devices, locations, or data from which media content is derived or obtained), and using hardware- and software-based media processing components (media processing components 306 and 326 are shown and discussed further below in connection with FIG. 4) such as readers, demultiplers, decoders, renderers, and/or decrypters to obtain playable media content streams 308, 328 from the information read from the media source(s).

It will be appreciated that media content manager 102 may have a dynamic processing load based on the identity and scheduling (pre-determined or based on serendipitous user input 150) of the various clips 123 comprising media component 122 and/or IC component 124. Generally, it is desirable for media processing pipelines to consume no more than 10-15% of the processing resources (for example, CPU cycles) of Presentation System 100.

Large amounts of processing resources can be consumed when information is transferred between memory locations using traditional copy transactions such as memory-to-memory copies, and the over-use of processing resources for copy transactions has the potential to cause glitches in the play of a digital media presentation. Yet, it is often desirable to transfer information between memories used by different components of media processing pipelines, especially between memories used by software components and memories used by hardware components. Hardware components are used, among other reasons, to accelerate media content processing.

Contemporaneously preparing for presentation upcoming portions of two or more clips can also consume large amounts of computing resources such as memory and processor cycles in a manner that is not easily predictable, and can further exacerbate the potential for glitches in the play of digital media content. Moreover, memory and/or processing resources required to prepare a particular portion of a clip for presentation (and thus times for such preparation) are not always constant from sample-to-sample or clip-to-clip. Some factors that affect required resources and preparation times are associated with the media content itself (including but not limited to factors such as media unit/sample size, media source/location, encoding or decoding parameters, and encryption parameters). Other factors that affect required resources are associated with the media content player (for example, media processing pipeline architecture, dynamic processing loads, and other features of media content player architecture), while still other factors that affect required resources are associated with user input (user-selected media content, content formats, or play speeds, for example).

With continuing reference to FIGS. 1-3, FIG. 4 is a simplified functional block diagram illustrating architectural and operational aspects of media processing component blocks 306 and 326 in more detail. In one possible implementation, the Microsoft® DirectShow™ multimedia framework is used to divide media processing tasks into groups of steps known as filters, with each filter having a number of input pins and a number of output pins that connect filters together. It will be appreciated, however, that any now known or later developed framework may be used to implement a media processing pipeline.

As shown, a software-hardware boundary 403 is indicated by a dashed line—components on the left side of boundary 403 are primarily software-based components (or portions of components implemented using software), and components on the right side of boundary 403 are primarily hardware-based components (or portions of components implemented using hardware or firmware or a combination thereof). An exemplary architecture includes a software-based media source reader 402 having access to a first memory 430 from which a hardware-based component can directly read from; a hardware-based demultiplexer ("demux") 404 generally having access to one or more blocks of memory (shown and referred to as a second memory 433 for discussion purposes); one or more hardware-based decoders/renderers 490 also generally having access to one or more blocks of memory (shown and referred to as second memory 433 for discussion purposes); one or more hardware-based decoders/renderers 490 also generally having access to one or more blocks of memory (shown and referred to as second memory 433 for discussion purposes); and application programming interfaces 408, which include a PhysMemDataStructure API 410, Sniffer/Callback APIs 422, and SyncHelper APIs 416 including GetDecodeTimes API 418 and SyncToSTC API 440.

Media source reader 402 is responsible for receiving (via data push or pull techniques) individually-presentable portions of clips (referred to for discussion purposes as media units 407) from a particular media source, storing the received media units 407 in memory 430, and for passing data regarding the stored media units 407 downstream (to demux 404 or decoders/renderers 490, for example). In one possible implementation, data is passed downstream to demux 404 using data structures. In the context of a Microsoft® DirectShow™ framework, for example, media units 407 are wrapped in data structures referred to as IMediaSample objects (IMediaSample references an interface the objects implement, the objects may be referred to as Media Samples). Often IMediaSample objects are constrained to a fixed size allocation at initialization time, and depending on sizes of media content units, may not be used to their full extent. Using a ring buffer 420 as discussed below enables more efficient use of memory.

Figure 7:
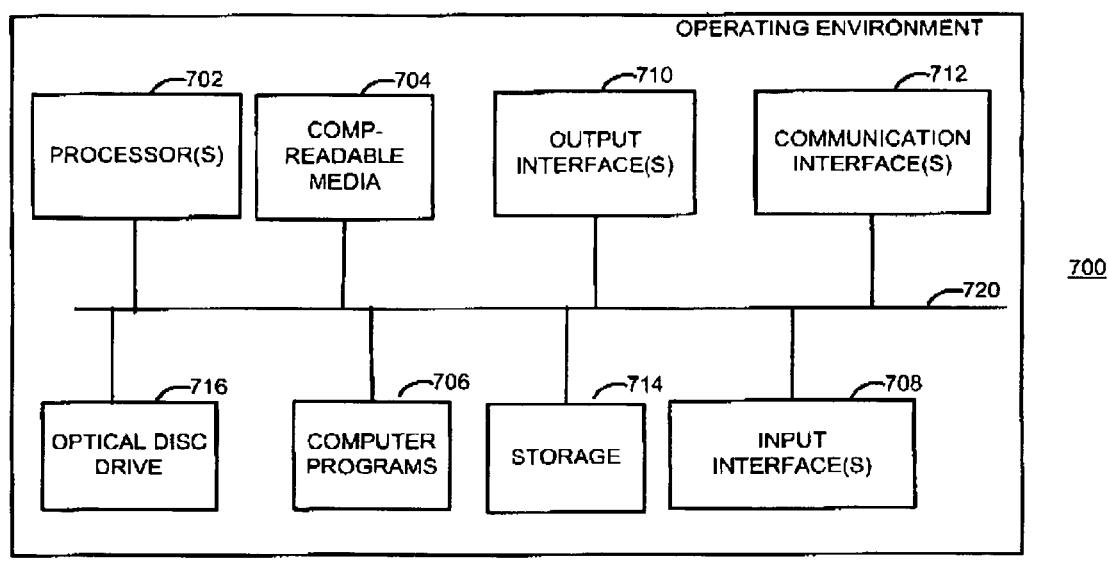
FIG. 7 is a simplified block diagram of an exemplary configuration of an operating environment in which all or part of the media content player shown in FIG. 1 or the methods shown in FIGS. 5 and 6 may be implemented or used.

Memory 430 represents any computer-readable medium (computer-readable media are discussed further below, in connection with FIG. 7) accessible via the operating system of Presentation System 100, including but not limited to physically contiguous and scatter-gathered memory, virtually cached and uncached memory, physically locked and unlocked (for scatter-gather type) memory, and virtual memory mapping optimized for usage by a ring buffer 420 (discussed further below). Hardware-allocated memory block 432 is an abstract representation of an amount or area (of any size or configuration) of memory 430 that can be viewed as having blocks that may be separately allocated, via media source reader 402, for access by demux 404 (or other components of media processing pipelines 302 or 320) in accordance with certain algorithms (an exemplary algorithm is shown and discussed below, in connection with FIG. 5) and via use of certain APIs 408, such as PhysMemDataStructure API 410. In one exemplary implementation, hardware-allocated memory block 432 is ring buffer 420 having blocks in which individual media content units 407 obtained from media source reader 402 are stored. An advantage of using ring buffer 420 is that some computer-readable media can be read more efficiently when data is read via tracks, especially when ring buffer 420 does not put any packet constraints on the read operation (for example, from an optical device). Another advantage of using ring buffer 420 is for trick modes, when data is read faster than usual (from an optical drive, for example). Skipping parts of media content units that are not required to perform a full decode is more easily achieved with the chunking mechanism built into the ring buffer reader. Other details of ring buffer 420 and the benefits and operation thereof are discussed further below, in connection with FIG. 5.

Demux 404 is responsive to receive media units 407 (such as next processable media sample(s) 270, shown in FIG. 2) and/or data structures associated with media units 407 at input pin 411 from output pin 401 of media source reader 402, and to separate two or more signals (such as decoded streams of media content) that were previously combined by a compatible multiplexer. Memory(ies) 433 represent(s) one or more computer-readable media (computer-readable media are discussed further below, in connection with FIG. 7), such as buffers or registers, usable by demux 404 or other hardware components. Demux 404 provides demultiplexed media samples 409 associated with individual media content streams (such as media content streams 308 or 328) on output pin 421 to an input pin 491 of decoders/renderers 490.

Decoders/renderers 490 are responsible for receiving demultiplexed media units, referred to for discussion purposes as media samples 409 (MPEG-2 samples, for example), and for using generally well-known techniques for unscrambling/unencrypting the demultiplexed media samples to produce media data 132 associated with a particular media content stream 308, 328. Although a one-to-one relationship between media sources, demultiplexers, and decoders/renderers is shown, it will be appreciated that any arrangement of any number of such components (along with additional components) is possible, and that such components may be shared between media processing pipeline1 302 and media processing pipeline2 320.

APIs 408 are provided to enhance the interoperability of software components and hardware components within a media processing pipeline, and to promote the efficient use of memory and processing resources of Presentation System 100. In one possible implementation, APIs 408 are sets of computer-executable instructions encoded on computer-readable storage media that may be either executed during operation of Presentation System 100 and/or accessed by authors of instructions for media processing components 306 and 326. Generally, APIs 408 are configured to perform aspects of the method(s) shown and discussed further below in connection with FIGS. 5 and 6.

PhysMemDataStructure API 410 is configured to generalize the support of memory 430 that can be directly consumed by hardware components such as demux 404 and decoders/renderers 490. In one possible implementation (in the context of a media processing pipeline having a DirectShow™ framework, for example) media units 407 wrapped in IMediaSample objects are allocated (by means of an implementation of an IMemAllocator object (using input pin 411 of demux 404, for example—output pin 401 would query input pin 411, so demux 404 can provide memory with properties usable/needed by the hardware) to storage locations within hardware-allocated memory block 432, and information about such storage locations (such as the type memory; a size of a memory block; a location of a pointer to the memory; and an offset location of a storage location of a particular media unit with respect to a pointer to the memory) is exposed to hardware components such as demux 404 and decoders/renderers 490 by PhysMemDataStructureAPI 410. Hardware components are thereby able to directly access/retrieve information within hardware-allocated memory block 432 (via direct memory access techniques, for example), instead of using instructions and processor cycles to copy the information.

Exemplary pseudo-code usable for implementing PhysMemDataStructureAPI 410 in the context of media processing pipelines 302, 320 and/or media processing components 306, 326 is shown below.

```
         interface IPhysMemMediaSample : IUnknown
{
    // S_OK==contigous physical memory, S_FALSE scatter/gather
    method required
    HRESULT IsContigous( );
    // S_OK==cached memory, S_FALSE uncached
    HRESULT IsCached( );
    // S_OK==memory is ready for dma operation
    // S_FALSE==memory needs PageLock/Unlock for DMA
    HRESULT IsPageLocked( );
    // S_OK==virtual memory pointer wraps around to start of
    // physical buffer when exceeding ring buffer size,
    // S_FALSE no wrap
    HRESULT IsAutoWrap( );
    // page size for scatter / gather table
    HRESULT PageSize(
        [out] DWORD      *pPageLength
        );
    // allow to build scatter/gather table after memory is locked
    HRESULT GetPhysicalPointer(
        [in] DWORD       offset,
        [out] DWORD      *pPhysAddress,
        [out] DWORD      *pLength
        );
    // allow to build scatter/gather table after memory is locked
    //
    HRESULT GetScatterGatherTable(
        [in] DWORD       size,
        [out, size_is(size)] DWORD *pTable,
        [out] DWORD      *pEntries
        );
    // size in bytes for DWORD array required to build
    // scatter gather table
    HRESULT GetScatterGatherTableSize(
        [out] DWORD      *pSize
        );
    // lock / unlock physical pages in buffer
    HRESULT PageLock( );
    HRESULT PageUnlock( );
    // cache writeback & discard
    // use before dma from media sample buffer to hardware
    HRESULT CacheSyncWriteback(
        [in] DWORD offset,
        [in] DWORD length
        );
    // cache discard / invalidate
    // use before dma from hardware to media sample buffer
    HRESULT CacheSyncDiscard(
        [in] DWORD offset,
        [in] DWORD length
        );
};
```

Sniffer/Callback APIs 422 are used to provide access by software-based elements of Presentation System 100 to certain media samples 409 (for example, "HLI," "ADV," and "NAV" packets multiplexed in a high-definition DVD program stream) that have been parsed by demux 404 and/or media data 132 that has been decoded/rendered by decoders/renderers 490. In one possible implementation, a DirectShow™ framework filter is connected to output pin 421 of demux 404 or an output pin (not shown) of decoders/renderers 490, and this filter is used to support the Sniffer/Callback APIs 422.

Exemplary pseudo-code usable for implementing a Sniffer/Callback API that will detect certain types of media samples 409 or media data 132 in the context of media processing pipelines 302, 320 and/or media processing components 306, 326 is shown below.

```
HRESULT RegisterCallback(
    [in] IRendererDataCallBack*    pCallBack
    );
```

In return, the callback renderer calls

```
HRESULT Callback(
    [in] IMediaSample*    pMediaSample
    ) ;
```

SyncHelper APIs 416 are configured to facilitate information exchange usable to maintain perceived synchronization between media content streams 308 and 328. GetDecodeTimes API 418 is configured to provide status notifications about certain times (such as title times 209 and media sample presentation times 202) associated with times at which certain media samples (for example, media units 407 or media samples 409 deemed to be next processable media samples 270) are being prepared for presentation by a hardware component (such as demux 404 or one or more decoders/renderers 490). Information provided via the SyncToSTC API 440 may be used, among other things, to adjust timing signals 350 and/or 370 based on differences in title times 209 returned by GetDecodeTimes API 418 from different decoders/renderers (or other hardware components) processing synchronously presentable media samples.

Exemplary pseudo-code usable for implementing SyncHelper APIs 416 is shown below.

```
/*++
    Implemented on the renderes
    Helper functions to synchronize streams and provide information
about PTS and STC times
--*/
interface ISyncHelper : IUnknown
{
    // Returns the current STC time and the PTS of the sample currently
being decoded in
    // PTS_TIME_BASE ticks
    //
    HRESULT
    GetDecodeTimes (
```

```
        [out] PTS_TIME* ptSTC,     // current STC time (global)
        [out] PTS_TIME* ptPTS      // current PTS time
        );
//
// Synchronize two sessions. Provides delta off the STC time to render
samples,
//
HRESULT
SyncToSTC (
        [in] STC_IDENTIFIER       // the clock to sync to
    stcToSyncTo,
        [in] PTS_TIME    tDelta   //  delta off the STC to render
samples at, can be –ve
        );
};
```

Figure 5:
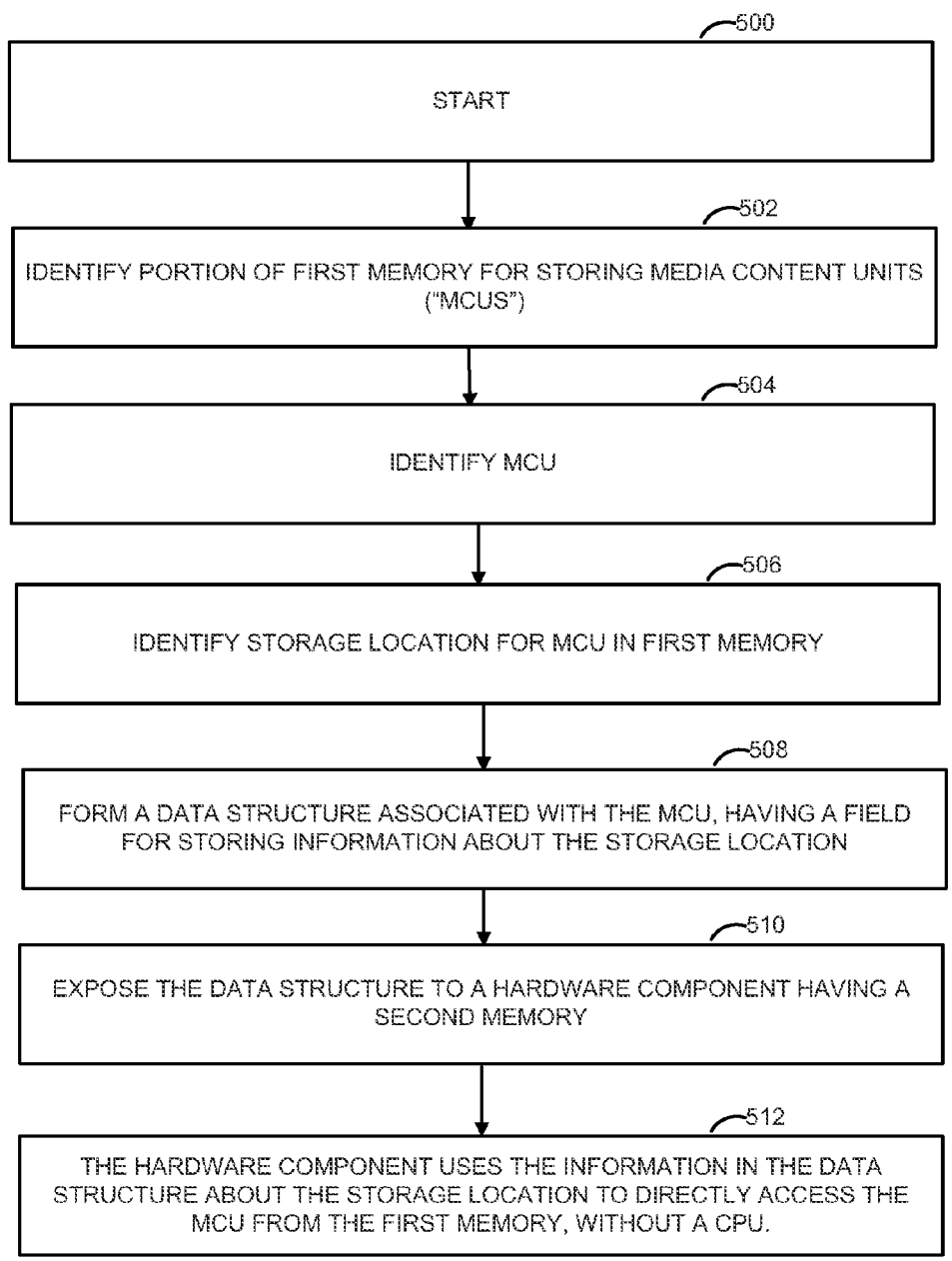
FIG. 5 is a flowchart of a method for preparing media content for presentation using aspects of the media content player shown in FIG. 1, a media processing pipeline shown in FIG. 3, and/or the architecture shown in FIG. 4.
Figure 6:
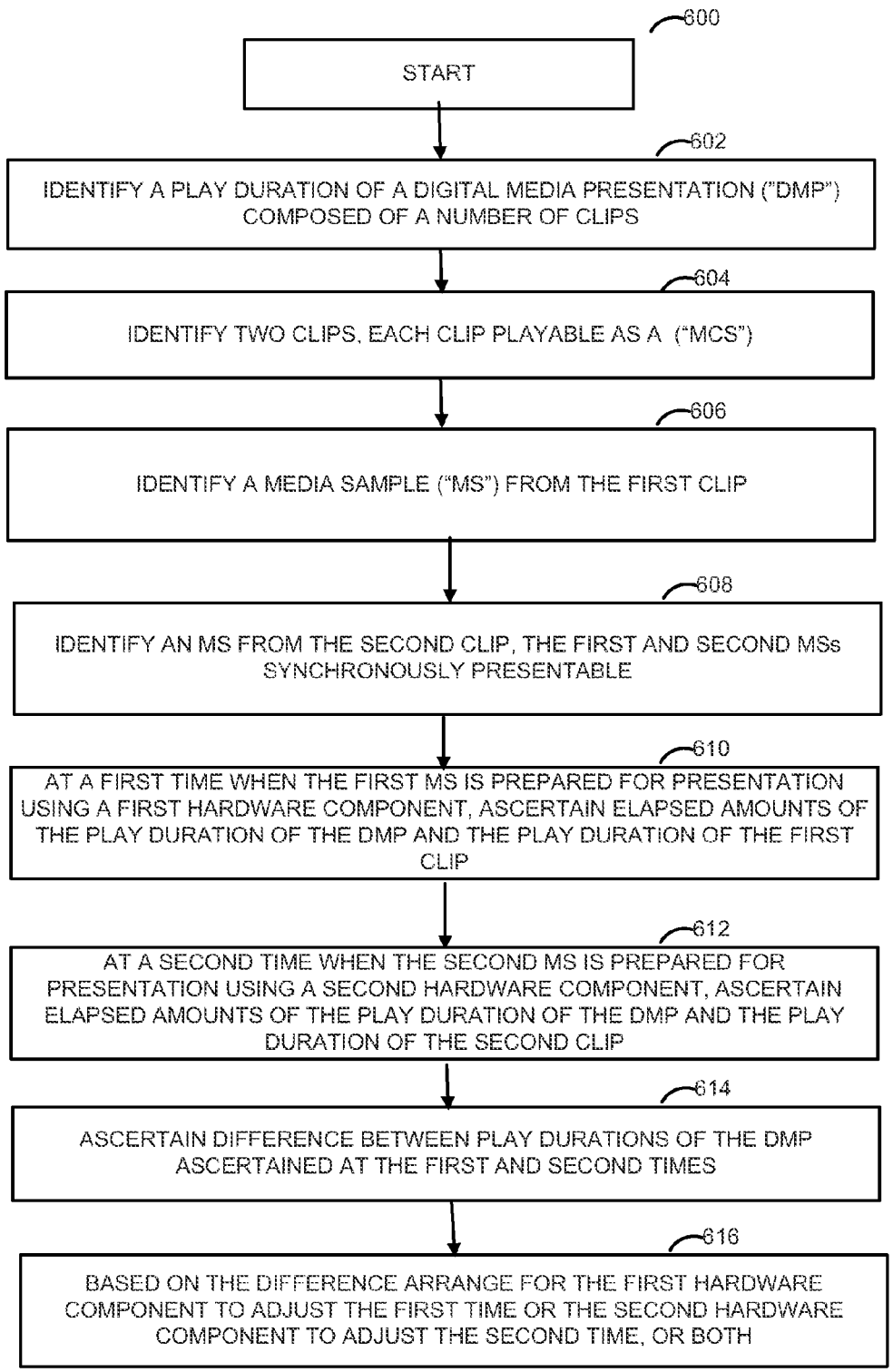
FIG. 6 a flowchart of a method for preparing portions of two clips of media content for synchronous presentation using aspects of the media content player shown in FIG. 1, the media processing pipeline(s) shown in FIG. 3, and/or the architecture shown in FIG. 4.

With continuing reference to FIGS. 1-4, FIGS. 5 and 6 are flowcharts of methods for preparing media content (such as portions of one or more clips 123) for presentation by one or more media processing pipelines (such as media processing pipeline1 302 or media processing pipeline2 320) using the functionality provided by one or more APIs 408. The method shown in FIG. 5 is useful to minimize the processing and/or memory resources used when information is transferred between a memory (such as memory 430) used by a software component (such as media source reader 402 or another software component) and a memory (such as memory 433) used by a hardware component (such as demux 404 or decoders/renderers 490 or other hardware components). The method shown in FIG. 6 is useful to maintain perceived synchronization when portions of multiple concurrently playable media content streams are prepared for presentation by separate hardware components.

The processes illustrated in FIGS. 5 and 6 may be implemented in one or more general, multi-purpose, or single-purpose processors, such as processor 702 discussed below in connection with FIG. 7. Unless specifically stated, the methods described herein are not constrained to a particular order or sequence. In addition, some of the described methods or elements thereof can occur or be performed concurrently.

Referring to the method shown in the flowchart of FIG. 5, the method begins at block 500 and continues at block 502, where a portion of a first memory, such as hardware-allocated memory block 432, is identified for storing media content units such as individually-playable portions of a clip 123 (such as media units 407 received from a particular media source 304). A particular media content unit and a storage location for the media content unit in the first memory are identified at blocks 504 and 506, respectively.

In the context of media processing components 306, 326 of media processing pipelines 302, 320, respectively, hardware-allocated memory block 432 may be implemented as ring buffer 420 to enhance the efficient use of memory and processing resources. Ring buffer 420 can be viewed as having blocks that may be separately allocated, via media source reader 402 (or other components of media processing pipelines 302 or 320), for storing media units 407. The offset of each media unit 407 stored in ring buffer 420 is known, and can be expressed relative to the values of one or more pointers to locations within ring buffer 420, such as a beginning of memory ("BOM") pointer 435, an end of memory ("EOM") pointer 437, a beginning of used memory pointer ("BUMP") 453, and/or an end of used memory pointer ("EUMP") 455. As demux 404 or another hardware component obtains representations of media units 407 from ring buffer 420, BUMP 453 and/or EUMP 455 may be moved accordingly. Because media units 407 may be obtained and released out of order, a list of offsets of media units 407 within ring buffer 420 may be maintained to ensure that BUMP 453 and EUMP 455 are not permitted to bypass each other.

To further enhance memory use and processing efficiencies, virtual memory may be used to duplicate one or more memory blocks from the beginning of ring buffer 420 to the end of ring buffer 420. As shown, duplicate BOM block 450 (which is a duplicate of beginning-of-memory "BOM" block 450) is implemented using virtual memory, and is logically located after end-of-memory "EOM" block 441. This use of virtual memory is referred to as the "auto-wrap" function, because it is especially useful when breaking up a larger block of memory to be used in a ring buffer fashion with read and write pointers. Use of the auto-wrap function is optional—generally the provider of demux 404 can choose to provide memory that does not map twice and the media processing pipeline will still work, but may make less efficient use of memory. In such a ring buffer implementation there is the special case that the piece of memory that "wraps around" to the beginning of the buffer may require special treatment. For example, copying or otherwise obtaining the information in the portion of memory that wraps around may require two transactions—one transaction to retrieve the information in the end of the buffer, and another transaction to retrieve the information in the beginning of the buffer. Thus, it is usually difficult to take full advantage of the ring buffer size. Use of virtual memory as described above avoids the need to either allocate extra memory or skip to the end of the ring buffer (both result in inefficient use of memory) when the information size is too large to fit at the end of the ring buffer.

Exemplary code usable (for Microsoft® Windows CE 6.0 operating system software, although any operating system using virtual memory may be used) for implementing an "auto-wrap" feature that maps a physical piece of memory twice to a double-sized virtual memory region is shown below.

```
// map physical memory twice to double sized virtual memory region
    CallerProc = GetCallerProcess( );
    VirtualAddress = VirtualAllocEx(CallerProc, 0, Size*2,
MEM_RESERVE, PAGE_NOACCESS);
    VirtualCopyEx(CallerProc , VirtualAddress,
        GetCurrentProcess( ), (PVOID)( PhysicalAddress>> 8), Size,
        PAGE_PHYSICAL | PAGE_READ WRITE | (Cached ? 0 :
PAGE_NOCACHE)) )
    VirtualCopyEx(CallerProc , (PBYTE) VirtualAddress+Size,
        GetCurrentProcess( ), (PVOID)( PhysicalAddress>> 8), Size,
        PAGE_PHYSICAL | PAGE_READWRITE | (Cached ? 0 :
    PAGE_NOCACHE))
```

Referring again to the flowchart of FIG. 5, block 508 illustrates the step of forming a data structure associated with the particular media content unit, the data structure having a field for storing information about the storage location of the media content unit in the first memory. Next, at block 510, the data structure is exposed to a hardware component (such as demux 404 or decoders/renderers 490) that has a second memory. At block 512, it can be seen that the hardware component can use the information in the data structure about the storage location of the media content unit to directly transfer the media content unit from the first memory to the second memory, without a central processing unit.

In the context of media processing components 306, 326 implemented using DirectShow™ frameworks, media source reader 402 uses data structures such as IMediaSampleObjects to provide all or some of the following information to downstream hardware components: pointers to memory 430 and/or hardware-allocated memory block 432; size of memory 430 and/or hardware-allocated memory block 432; start and stop times of media units 407; flag(s); and any other desired information. Advantageously, information regarding properties of memory blocks of ring buffer 420 allocated by media source reader 402 for access by demux 404 (and other hardware components) are exposed via PhysMemDataStructure API 410, which may also be provided by a data structure (or fields thereof) such as the IMediaSampleObject. Physical memory information derived by demux 404 and other hardware components from the PhysMemDataStructure API 410 are used to directly access storage location of individual media content units 407 within ring buffer 420, largely obviating the need for processor-intensive copy transactions such as "memcopy" transactions. Information regarding properties of hardware-allocated memory block 432 that is exposed via the PhysMemDataStructure API 410 include but is not limited to: the type of memory 432; a size of a memory block of the memory; a location of one or more pointers 437, 435, 453, or 455 to the memory; and an offset location of a particular media unit 407 with respect to one or more pointers to the memory.

Referring to the method shown in the flowchart of FIG. 6, the method begins at block 600 and continues at blocks 602 and 604, where, respectively, a play duration of a multimedia presentation is identified, and two clips (each having their own play durations) playable as separate media content streams, such as media content stream 308 and media content stream 328, are identified. Next, two synchronously presentable media samples, one from the first clip and one from the second clip, are identified, at blocks 606 and 608, respectively.

Generally, software-based components of Presentation System (such as aspects of presentation manager 106) are aware of currently playable clips 123. In the context of media processing components 306, 326 of media processing pipelines 302, 320, respectively, it is possible to use Sniffer/Callback APIs 422 to identify specific media units 407 and/or media samples 409 being processed by demux 404 and/or decoders/renderers 490.

As indicated at block 610, certain information is ascertained at a first time—the first time associated with when the media sample from the first clip is undergoing preparation for presentation by a first hardware component, such as demux 404 or decoder/renderer 490 within media processing pipeline1 302. The following information is ascertained at block 610: an elapsed amount of the play duration of the digital media presentation, and an elapsed amount of the play duration of the first clip.

As indicated at block 612, certain information is ascertained at a second time—the second time associated with when the media sample from the second clip is undergoing preparation for presentation by a second hardware component, such as demux 404 or decoder/renderer 490 within media processing pipeline2 322. The following information is ascertained at block 612: an elapsed amount of the play duration of the digital media presentation, and an elapsed amount of the play duration of the second clip.

As discussed above in connection with the media exemplary media timeline shown in FIG. 2, the elapsed amount of the play duration is often referred to the title time (or the global system time), and an elapsed amount of the play duration of the a particular clip generally corresponds to a particular pre-determined media sample presentation time 202 associated with a particular media sample. The GetDecodeTimes API 418 is configured to examine media samples and/or media timelines 142 of both the first and second clips, and to return the information indicated at blocks 610 and 612.

At block 614, the difference between the elapsed amount of the play duration of the digital media presentation calculated at block 610 and the elapsed amount of the play duration of the digital media presentation calculated at block 612 is ascertained, and, as indicated at block 616, is usable to adjust timing of the hardware components for preparing and/or presenting media samples.

In the context of media processing components 306, 326 of media processing pipelines 302, 320, respectively, the SyncToSTC API 440 is configured to use information obtained via the GetDecodeTimesAPI 418 to synchronize various media content streams from different hardware components, by applying deltas (based on the difference between the elapsed amount of the play duration ascertained at block 614) to processing times and/or timing signals, such as timing signals 350 and 370. It will be appreciated that the SyncToSTC API 440 can also be used to synchronize media content streams with other playback constraints (for example, as defined by a playlist).

With continued reference to FIGS. 1-6, FIG. 7 is a block diagram of an exemplary configuration of an operating environment 700 in which all or part of Presentation System 100 may be implemented or used. Operating environment 700 is generally indicative of a wide variety of general-purpose or special-purpose computing environments. Operating environment 700 is only one example of a suitable operating environment and is not intended to suggest any limitation as to the scope of use or functionality of the system(s) and methods described herein. For example, operating environment 700 may be a type of computer, such as a personal computer, a workstation, a server, a portable device, a laptop, a tablet, or any other type of electronic device, such as an optical media player or another type of media player, now known or later developed, or any aspect thereof. Operating environment 700 may also be a distributed computing network or a Web service, for example. A specific example of operating environment 700 is an environment, such as a DVD player or an operating system associated therewith, which facilitates playing high-definition DVD movies.

As shown, operating environment 700 includes or accesses components of a computing unit, including one or more processors 702, computer-readable media 704, and computer programs 706. Processor(s) 702 is/are responsive to computer-readable media 704 and to computer programs 706. Processor(s) 702 may be physical or virtual processors, and may execute instructions at the assembly, compiled, or machine-level to perform a particular process. Such instructions may be created using source code or any other known computer program design tool.

Computer-readable media 704 represent any number and combination of local or remote devices, in any form, now known or later developed, capable of recording, storing, or transmitting computer-readable data, such as the instructions executable by processor 702. In particular, computer-readable media 704 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 704 may also include transmission media and data associated therewith. Examples of transmission media/data include, but are not limited to, data embodied in any form of wire line or wireless transmission, such as packetized or non-packetized data carried by a modulated carrier signal. The above notwithstanding, computer-readable media 704 does not include any form of propagated data signal.

Computer programs 706 represent any signal processing methods or stored instructions that electronically control predetermined operations on data. In general, computer programs 706 are computer-executable instructions implemented as software components according to well-known practices for component-based software development, and encoded in computer-readable media (such as computer-readable media 704). Computer programs may be combined or distributed in various ways.

Storage 714 includes additional or different computer-readable media associated specifically with operating environment 700, such as an optical disc or other portable (optical discs are handled by optional optical disc drive 716). One or more internal buses 720, which are well-known and widely available elements, may be used to carry data, addresses, control signals and other information within, to, or from operating environment 700 or elements thereof.

Input interface(s) 708 provide input to computing environment 700. Input may be collected using any type of now known or later-developed interface, such as a user interface. User interfaces may be touch-input devices such as remote controls, displays, mice, pens, styluses, trackballs, keyboards, microphones, scanning devices, and all types of devices that are used input data.

Output interface(s) 710 provide output from operating environment 700. Examples of output interface(s) 710 include displays, printers, speakers, drives (such as optical disc drive 716 and other disc drives or storage media), and the like.

External communication interface(s) 712 are available to enhance the ability of operating environment 700 to receive information from, or to transmit information to, another entity via a communication medium such as a channel signal, a data signal, or a computer-readable medium. External communication interface(s) 712 may be, or may include, elements such as cable modems, data terminal equipment, media players, data storage devices, personal digital assistants, or any other device or component/combination thereof, along with associated network support devices and/or software or interfaces.

Figure 8:
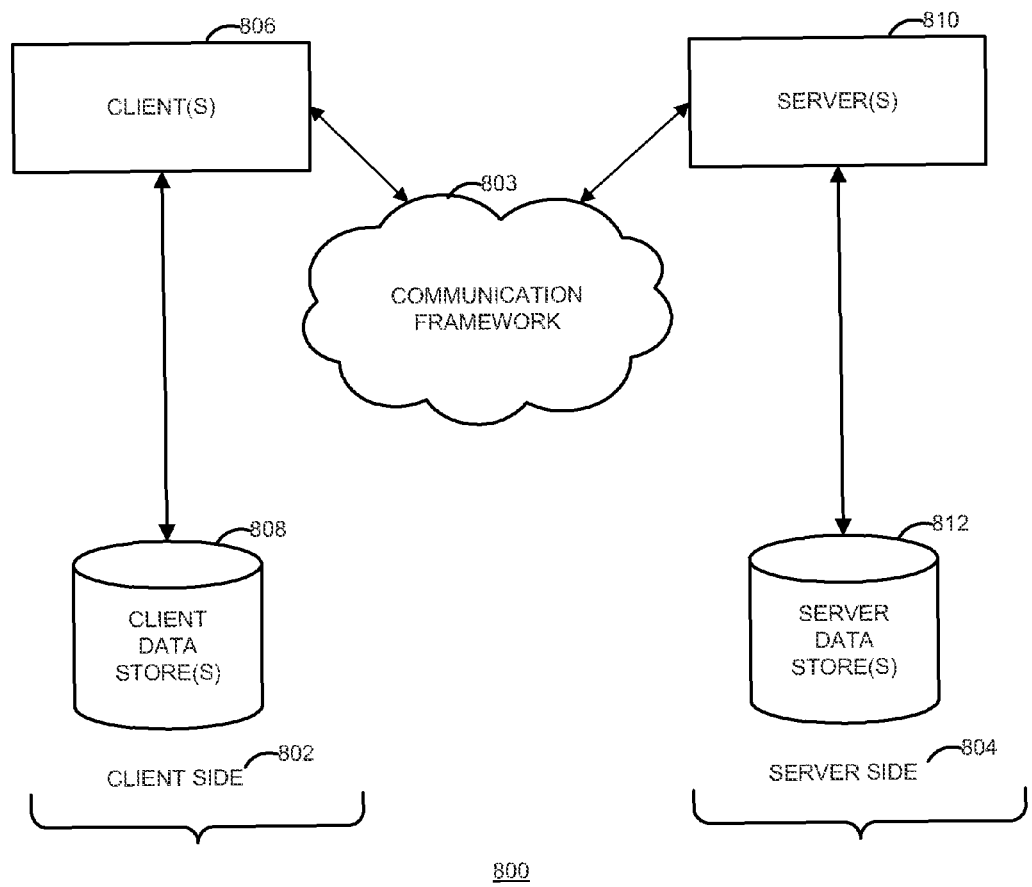
FIG. 8 is a simplified block diagram of a client-server architecture in which aspects of the operating environment shown in FIG. 7 may be implemented or used.

FIG. 8 is a simplified functional diagram of a client-server architecture 800 in connection with which the Presentation System 100 or operating environment 700 may be used. One or more aspects of Presentation System 100 and/or operating environment 700 may be represented on a client-side 802 of architecture 800 or on a server-side 804 of architecture 800. As shown, communication framework 803 (which may be any public or private network of any type, for example, wired or wireless) facilitates communication between client-side 802 and server-side 804.

On client-side 802, one or more clients 806, which may be implemented in hardware, software, firmware, or any combination thereof, are responsive to client data stores 808. Client data stores 808 may be computer-readable media 704, employed to store information local to clients 806. On server-side 804, one or more servers 810 are responsive to server data stores 812. Like client data stores 808, server data stores 812 may include one or more computer-readable media 704, employed to store information local to servers 810.

Various aspects of a presentation system that is used to present interactive content to a user synchronously with media content have been described. It will be understood, however, that all of the described components of the presentation system need not be used, nor must the components, when used, be present concurrently. Functions/components described in the context of Presentation System 100 as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-readable medium, not consisting of a propagated data signal, encoded with computer-executable instructions which, when executed by a processor, perform a method for preparing media content as a media presentation by a software-based media player including a decoder/renderer, the media content receivable from a media source as a plurality of media content units, the method comprising:
   identifying a ring buffer having a beginning memory block and an ending memory block that are configured to be separately allocated, the ring buffer allocated for storing media content units received from the media source which include individually-presentable portion of clips that form the media presentation received at a component, the component providing scheduling information, responsive to a timing signal, to the decoder/renderer to enable time-based synchronization of the individually-presentable portions of clips,
   wherein the ring buffer is implemented using a begin pointer for referencing the beginning of used memory in the ring buffer and an end pointer for referencing the end of used memory in the ring buffer;
   identifying an offset of a first media content unit within the ring buffer, the offset specified relative to the begin pointer or the end pointer or both;
   identifying a plurality of media content units received from the media source;
   identifying storage locations and offsets within the ring buffer in which each of the plurality of media content units has been stored;
   forming data structures associated with each of the plurality of media content units, the data structures each having a field for storing information about the storage location of a particular media content unit;

arranging for exposure of the data structures to a memory, the information about the storage locations of the particular media content units obtained from the data structures usable by the memory to directly access the particular media content unit from the ring buffer; and after accessing a particular media content unit, releasing the particular media content unit from the storage location by moving the begin pointer or the end pointer or both.

2. The computer-readable medium according to claim 1, wherein the ring buffer is selected from the group consisting of: a contiguous physical memory, a locked scatter-gathered physical memory, an unlocked scatter-gathered physical memory, a cached virtual memory, and an uncached virtual memory, and wherein the information about the storage locations exposed by the data structures is selected from the group consisting of: a type of the ring buffer; a size of a memory block of the ring buffer; a location of a pointer to the ring buffer; and an offset location of the first storage location with respect to a pointer to the ring buffer.

3. The computer-readable medium according to claim 1, wherein the beginning memory block is duplicated, using virtual memory, after the ending memory block.

4. The computer-readable medium according to claim 3, wherein the method further comprises the step of:
when a first storage location would include the beginning memory block and the ending memory block, storing a first portion of the first media content unit in the ending memory block and a second portion of the first media content unit in the beginning memory block duplicated using virtual memory.

5. The computer-readable medium according to claim 4, the method further comprising:
after the first media content unit has been transmitted, releasing the first media content unit from the first storage location by moving the begin pointer or the end pointer or both.

6. The computer-readable medium according to claim 1, further comprising:
maintaining a list of offset positions including storage locations of all media content units stored in the ring buffer; and
using the list of offset positions to ensure that the begin pointer and the end pointer do not bypass each other when media content units are released from the storage locations.

7. The computer-readable medium according to claim 1, wherein the method is performed within a media processing pipeline comprising a filter graph having a plurality of filters, each filter having one or more input pins and one or more output pins.

8. The computer-readable medium according to claim 7, wherein the component comprises one of the plurality of filters, and wherein the component is a hardware component.

9. The computer-readable medium according to claim 8, wherein the hardware component is selected from the group consisting of: a demultiplexer, a decoder, and a renderer.

10. The computer-readable medium according to claim 7, wherein the method is performed by a software component comprising one of the plurality of filters, the software component having an input pin configured to receive media content units and an output pin configured for communication with the component.

11. A computer-readable medium, not consisting of a propagated data signal, encoded with computer-executable instructions which, when executed by a processor, perform a method for preparing media content as a media presentation by a software-based media player including a decoder/renderer, the media content receivable from a media source as a plurality of media content units, the method comprising:
identifying a first storage location in which a first media content unit has been stored in an allocated portion of a first memory for storing media content units comprising individually-presentable portions of clips received from the media source, the individually-presentable portions of clips being multiplexed into a single program stream comprising the media presentation received at a first component providing scheduling information to the decoder/renderer to enable time-based synchronization of the individually-presentable portions of clips;
forming a first data structure associated with the first media content unit, the first data structure having a field for storing information about the first storage location;
arranging for exposing the first data structure to the first component;
the information about the first storage location obtained from the first data structure usable to access the first media content unit from the first memory;
wherein the method is performed by a software component comprising one of the plurality of filters, the software component having an input pin configured to receive media content units and an output pin configured for communication with the first component; and
wherein forming the first data structure includes:
using the software component to issue a call to receive information about the first storage location and to populate the field of the first data structure with the information about the first storage location; and
receiving a response exposing the field of the first data structure with the information about the first storage location.

12. The computer-readable medium according to claim 11, wherein the step of arranging for exposing the first data structure to a first component comprises transmitting, on the output pin configured for communication with the first component, the first data structure with the field of the first data structure exposed.

13. The computer-readable medium according to claim 11, wherein the allocated portion of the first memory allocated for storing media content units received from the media source is arranged as a ring buffer, the ring buffer having a beginning memory block and an ending memory block, and wherein the ring buffer is implemented using a begin pointer for referencing the beginning of used memory in the ring buffer and an end pointer for referencing the end of used memory in the ring buffer.

14. The computer-readable medium according to claim 13, wherein the ring buffer is selected from the group consisting of: a contiguous physical memory, a locked scatter-gathered physical memory, an unlocked scatter-gathered physical memory, a cached virtual memory, and an uncached virtual memory, and wherein the information about the first storage location exposed by the first data structure is selected from the group consisting of: a type of the ring buffer; a size of a memory block of the ring buffer; a location of a pointer to the ring buffer; and an offset location of the first storage location with respect to a pointer to the ring buffer.

15. The computer-readable medium according to claim 13, wherein the beginning memory block is duplicated, using virtual memory, after the ending memory block.

16. A computer-readable medium, not consisting of a propagated data signal, encoded with computer-executable instructions which, when executed by a processor, perform a method for playing a digital media presentation having a play duration and a media content component, the media content component comprising:

a first clip arranged into a first plurality of media samples for rendering in a multiplexed media content stream, the first clip having a first play duration and playable by a decoder/renderer and a second clip arranged into a second plurality of media samples for rendering in the multiplexed media content stream, the second clip having a second play duration and playable by the decoder/renderer, the method comprising:

at a first time associated with preparing a first media sample from the first clip for presentation based on a first timing signal, ascertaining a first elapsed amount of the play duration of the digital media presentation, and ascertaining an elapsed amount of the first and second play durations;

at a second time associated with preparing a second media sample from the second clip for presentation at a rate based on a second timing signal, the second media sample synchronously playable with the first media sample, ascertaining a second elapsed amount of the play duration of the digital media presentation, and ascertaining a difference between the first elapsed amount of the play duration of the digital media presentation and the second elapsed amount of the play duration of the digital media presentation, the ascertaining utilizing scheduling information provided responsive to a received timing signal, to the decoder/renderer during playback of the media presentation to enable synchronization of the first and second clips in the multiplexed media content stream; and based on the difference, adjusting either the first time or the second time or both;

wherein the steps of ascertaining the first elapsed amount of the play duration of the digital media presentation and the elapsed amount of the first play duration further comprise:

based on a first call that includes information about the first media sample, receiving a first response that includes information about the first elapsed amount of the play duration of the digital media presentation and the elapsed amount of the first play duration, and wherein the steps of ascertaining the second elapsed amount of the play duration of the digital media presentation and the elapsed amount of the second play duration further comprise:

based on a second call that includes information about the second media sample, receiving a second response, the second response including information about the second elapsed amount of the play duration of the digital media presentation and the elapsed amount of the second play duration.

17. The computer-readable medium according to claim 16 wherein the scheduling information is provided by a hardware component.

18. The computer-readable medium according to claim 17 wherein the hardware component is selected from the group consisting of: demultiplexers; decoders; and renderers.

19. The computer-readable medium according to claim 16 wherein preparation of the first media sample from the first clip for presentation uses a first hardware component at a rate based on a first timing signal and preparation of the second media sample from the second clip for presentation uses a second hardware component at a rate based on a second timing signal.

20. The computer-readable medium according to claim 19, wherein the step of adjusting either the first time or the second time or both further comprises:

issuing a call to an Application Programing Interface (API), the call including information selected from the group consisting of:

the first response, the second response, and the difference between the first elapsed amount of the play duration of the digital media presentation and the second elapsed amount of the play duration of the digital media presentation;

based on the call to the API, receiving a response from the API; and based on the response from the API, adjusting one or more of the group consisting of: the elapsed amount of the first play duration; the elapsed amount of the second play duration; the first timing signal; and the second timing signal.

* * * * *